Figure 1:
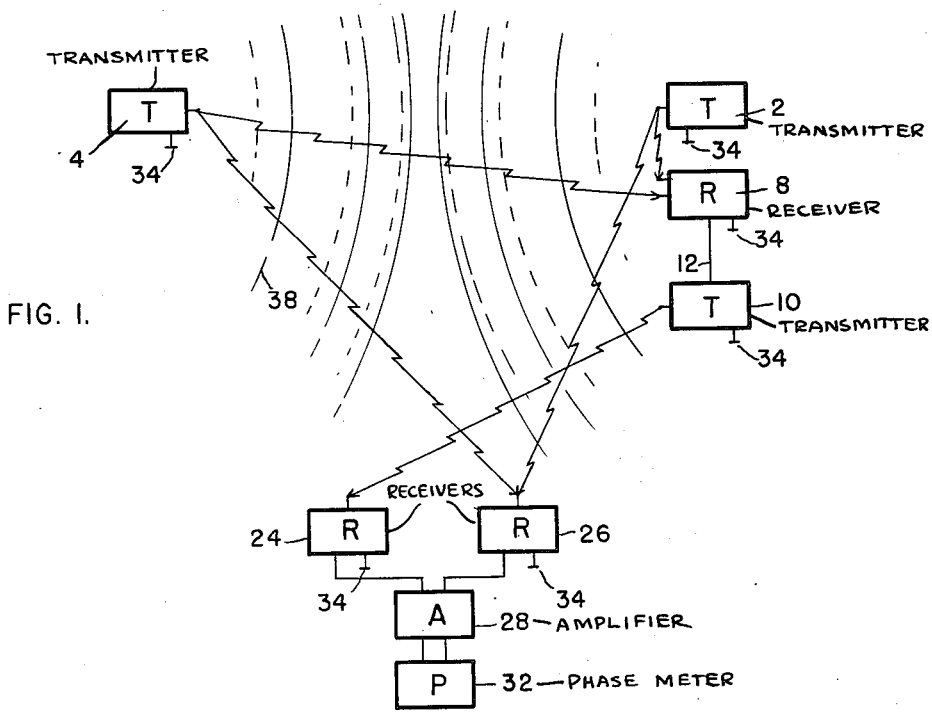

Oct. 28, 1952   D. N. TIMBIE   2,616,079
NAVIGATION LANE IDENTIFICATION
Filed June 8, 1948

Inventor
DONALD N. TIMBIE

Cushman, Darby & Cushman
Attorneys

Patented Oct. 28, 1952

2,616,079

UNITED STATES PATENT OFFICE 2,616,079

NAVIGATION LANE IDENTIFICATION

Donald N. Timbie, Bethesda, Md., assignor to Hastings Instrument Company, Inc., Hampton, Va., a corporation of Virginia Application June 8, 1948, Serial No. 31,642

7 Claims. (Cl. 343—105)

This invention relates to a lane identification system as used in the various navigational and tracking aids.

In navigational equipment depending upon phase relationships for determination of position, lane identification has been accomplished by changing the frequencies within a given channel. The difficulty with this method has been that the change in phase thus produced is very slight because of the small frequency change that can be made within a given channel. In the system of this invention, however, the channel of these transmitted frequencies is changed so as to give an extremely large phase change. This can be done by interchanging the transmitter frequencies of a communication channel with a navigational channel or by interchanging the navigational channel with any other channel that is being used in connection with the navigational equipment.

It is the object of this invention to provide a method and means for lane determination in a navigational system depending on the phase relationship between two carriers.

Figure 2:
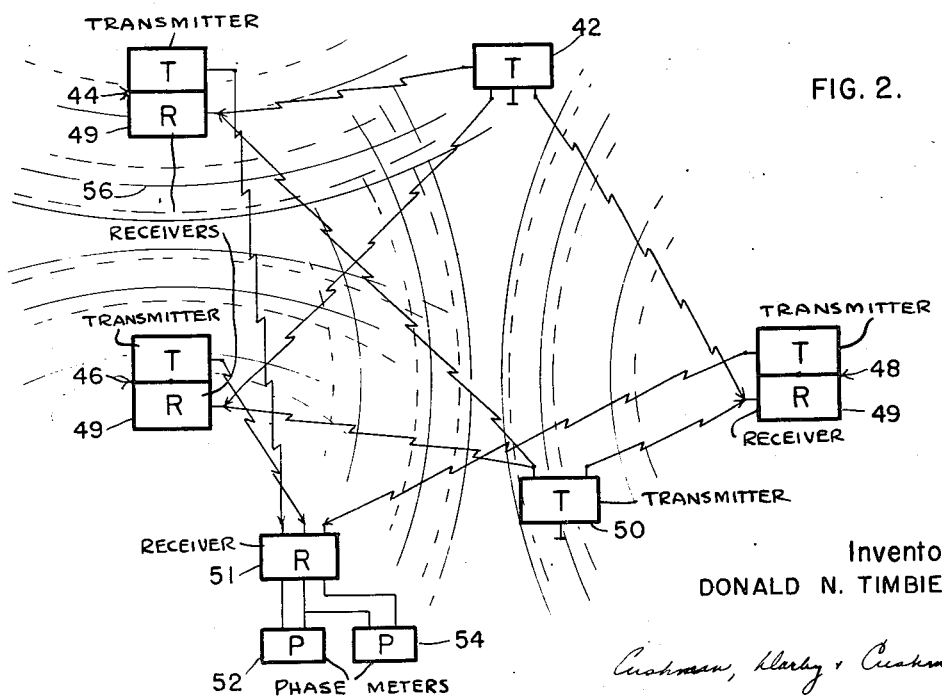

Referring to the drawings:

Figure 1 shows a navigational system comprising two fixed transmitting stations and moving receivers, and Figure 2 shows a navigational system having three fixed relay stations and a moving transmitter.

Although the following discussion is related to the details of two navigational systems, it is not intended that this method of operation be restricted to these particular systems.

Figure 1 shows a navigational system comprising a reference transmitter 2, a fixed transmitter 4, a receiving means 8 capable of detecting the beat frequencies between the reference transmitter and the fixed transmitter, a transmitter 10 and connecting means 12 for modulating transmitter 10 with the output of receiver 8.

The navigational equipment aboard the moving object consists of a receiver 24 tuned to receive emissions from transmitter 10, and a second receiving means 26 for receiving and detecting the beat frequencies between transmitters 2 and 4. The outputs of the receiving means 24 and 26 are fed to phase splitting and constant output amplifiers 28, and from there to phase indicator 32. Tuning means 34 are provided for each transmitter and receiver.

This navigational system provides a means for determining position with respect to a family of hyperbolas, having its focal points at transmitters 2 and 4. If the moving object travels along one of the hyperbolic lines 38, the phase indicator 32 does not change, but in moving from one hyperbolic line to the other, so as to change the difference in the distances from the receivers 24 and 26 to the transmitters 2 and 4 by an amount equal to the wave length of their carrier frequency, the phase indicator changes 360°. If the wave lengths of the carrier frequencies of the transmitters 2 and 4 are large with respect to the distance of the moving object from them, a lane identification system is not necessary, but, if the wave lengths of the carrier frequencies of the transmitters 2 and 4 are small in comparison with the distances of the moving object from them, the phase indicator gives no indication of how many wave lengths away the moving object is and, therefore, a lane identification system becomes essential. It is, of course, possible to start from a known lane and integrate the changes in phase of phase indicator 32 as the object moves around, but this has the obvious disadvantage of making it necessary to operate the navigational equipment continuously after leaving a known point. One of the advantages of having a lane identification system is that the transmitters and receivers can be used for communication or other purposes and navigational information can be obtained at any time it is desired. It should be understood that every time the difference in the distances between the moving object and transmitters 2 and 4 changes by amount equal to one half of the wave length of the carrier frequencies emitted from transmitters 2 or 4, that there is a change in phase indicator reading of 360°.

Because the phase angle indicated at any particular position is dependent upon the frequencies of the transmitters 2 and 4, it is obvious that a change in the transmitted frequencies produces a change in the phase indication. Inasmuch as the phase indicator reading depends upon both the frequency and the difference in distances between the moving object and the two transmitters which are at the focal points of the hyperbolic system, it can be seen that for a given change in frequency, that the phase indication changes a greater amount where the difference in the distances is the greatest and, correspondingly decreasing amounts as the distances approach equality. Thus, the change in phase indication as the transmitters 2 and 4, for example, are changed in frequency, can be calculated in advance for any particular position.

In the past, the changes in frequency of the transmitters 2 and 4 have been confined to a single channel and, therefore, the amount of phase difference that is produced even when the difference of the distances from the moving object to the transmitters is great is extremely hard to measure. Therefore, it is proposed that the transmitters 2 and 4 and receivers 8 and 26 be tuned to the channel in which transmitter 10 and receiver 24 originally operated and that transmitter 10 and receiver 24 then be operated in a channel previously occupied by the transmitters 2 and 4. As these channels are a great distance apart on the frequency spectrum, large changes in phase indication can thus be produced and so increase the accuracy of the measurement. It is only necessary that it be possible to determine the difference in phase change between one solid line and the next as intermediate readings indicate that the moving object is in the lane between those hyperbolic lines and reversing the channels of operation back to their normal positions, gives a precise phase indication of the position within the lane.

This method may be used to give navigational information as the change in phase, if it is large enough to be read accurately, shows the exact position with respect to the family of hyperbolas by interpolation between two known amounts of phase change such as indicated by the dotted lines in Figure 1. However, this is limited for as soon as the difference in the channel frequencies used for transmitters 2 and 4 and for transmitter 10 becomes great enough so that an exchange of operating channels produces a change in the phase indication of 360° at any point intermediate transmitters 2 and 4, the problem of lane identification is started all over again as it is impossible to know, without other information, exactly which 360° the moving object is in.

Figure 2 shows another type of navigational system that depends upon change in phase relationships of carrier frequencies. The moving object is equipped with a transmitter 42 and relay stations 44, 46 and 48 are each equipped with a receiver 49 capable of detecting the beat frequency between the mobile transmitter 42 and a reference transmitter 50. The outputs of the receivers are relayed back by any desired means to any desired location 51, and any two pairs of these outputs are applied to two phase indicators 52 and 54. The relay stations 44 and 46 are the focal points of one family of hyperbolas and the relay stations 46 and 48 are the focal points of an intersecting family of hyperbolas. The solid lines 56 are drawn at a locus such that the difference in the distance between the mobile transmitter and the relay stations 44 and 46 is constant and the phase indicator 52 reads zero. Therefore, in passing from one hyperbolic line to the other, the phase indicator changes and passes through one complete revolution of 360°.

If the distance between the hyperbolic lines is large compared with the distance between the relay stations 44 and 46, a lane identification system obviously becomes unnecessary but if the distances between the hyperbolic lines is small with respect to the distance between the relay stations 46 and 48, then it is impossible, by reading the phase indicator 52, to determine which lane the moving object is in—a lane being the space between two hyperbolic lines. It is apparent that greater accuracy is obtained by the latter system in that the distance per degree of phase indicator reading is much smaller. As was pointed out above in connection with the navigational system described in Figure 1, it is possible to start from a known point and integrate the changes in phase indicator readings so as to make it unnecessary to provide means for determining lane but this method is unsatisfactory for the reasons discussed above.

The phase indicator readings are a function of the difference in the distances between the mobile transmitter 42 and the relay stations as well as the frequencies of the mobile and reference transmitters. Therefore, if the frequencies of these transmitters are changed a given amount, the amount of change in the phase indicator readings depends upon the position of the mobile transmitter. The dotted hyperbolic lines show the changes in phase indicator reading that are observed if the moving transmitter is located on the solid lines and the transmitted frequencies of the mobile and reference transmitters are changed, the change being greater at positions closest to the relay stations and less at positions half-way between the relay stations for the reason that the difference in the distances between the mobile transmitter and the relay stations is greatest when the mobile transmitter is near either station. As long as it is possible to produce a readable change in phase indication between one solid line and another, it is possible to determine the lane.

The methods used previous to this invention have been limited because they attempt to change the frequency of the mobile and reference transmitters within one channel but this invention contemplates changing the channel of the mobile and reference transmitters without necessitating the assignment of additional channels and if the channel of operation of the mobile and reference transmitters is changed to a different channel, the changes in the phase indicator reading for any given position are greatly increased, thus making accurate determination of lane possible and even providing a basis for navigation.

In the navigational system as indicated by Figure 2, the relay stations are all equipped with transmitters operating at unique frequencies and any one of them can be tuned to operate in the channel originally occupied by the reference and mobile transmitters and the latter can be tuned to operate in the channel originally occupied by the relay transmitter, thus giving a large change in phase indication.

It is contemplated that in any system in which this lane identification system is employed, that the interchange of the carrier channels be accomplished by automatic means such as a tone modulation and switching system. It is intended, also, that the methods disclosed in this invention be applied to any navigational system in which the navigational data depends upon the carrier frequencies of a plurality of transmitters.

I claim:

1. A navigational method of lane identification comprising the steps of transmitting from two spaced transmitters in a common first channel, detecting the beat frequency between said transmissions at two spaced points, relaying the beat frequency so detected at one of said spaced points to the other of said points, measuring the difference in phase between said beat frequencies at said other point, changing the frequency of transmission of said transmitters to a common second channel and measuring the resultant change in phase difference effected at said other point.

2. A navigational method of lane identification comprising the steps of transmitting from two spaced transmitters in a common first channel, detecting the beat frequency between said transmissions at two spaced points, relaying said beat frequencies to a common point, measuring the difference in phase between said frequencies at said common point, changing the frequency of transmission of said transmitters to a common second channel, and measuring the resultant change in phase difference effected at said common point.

3. A navigational method of lane identification comprising the steps of transmitting from two spaced transmitters in a common first channel, detecting the beat frequency between said transmitters at two spaced points, relaying said beat frequencies to a common point, one of said beat frequencies being relayed by transmission in a second channel, measuring the difference in phase between said beat frequencies at said common point, changing the frequency of transmission of said transmitters whereby the channels of transmission are interchanged, and measuring the magnitude and direction of the resultant change in phase difference effected at said common point.

4. A navigation system comprising two fixed transmitters tuned to transmit in a first channel, a fixed receiving means for receiving and detecting the beat frequency between said transmitters, a third transmitter tuned to operate in a second channel, means to modulate said third transmitter with the output of said fixed receiving means, a first mobile receiving means for detecting the beat frequency between said two fixed transmitters, a second mobile receiving means tuned to said second channel, means for measuring the difference in phase between the outputs of said first and second mobile receiving means, and means for changing the frequency of transmission of said transmitters, whereby said two fixed transmitters may be tuned to operate in said second channel, and said third transmitter may be tuned to operate in said first channel.

5. A navigation system comprising a mobile transmitter and a reference transmitter, said transmitters being tuned to operate in a first channel, a plurality of relay stations including means to receive and detect the beat frequencies between said transmitters and relay transmitters tuned to operate in a second channel, means for modulating said relay transmitters with the output of said receiving means, means for indicating the difference in phase between said relay transmissions, and means for changing the frequencies of said transmitters and relay transmitters, whereby said mobile transmitter and said reference transmitter may be tuned to operate in said second channel, and said relay transmitters may be tuned to operate in said first channel.

6. A navigation system comprising two spaced transmitters tuned to transmit in a first allocated channel at frequencies differing by a predetermined amount, at least two receiving means tuned to receive the transmissions of said transmitters and detect the beat frequency therebetween, other transmission means tuned in a second allocated channel for relaying a detected beat frequency by means of carrier modulation to a common point for phase comparison, and means for changing the frequency of transmission of said transmitters to operate the first two transmitters in the second channel and said other transmitters in the first channel.

7. A navigational method of lane identification comprising the steps of transmitting from two spaced transmitters in a first channel at frequencies differing by beat frequency, detecting the beat frequency at at least two spaced points, relaying a detected beat frequency in a second transmission channel to a common point for phase comparison to determine a position within an unknown one of a plurality of lanes, and subsequently interchanging the transmissions between the first and second channels to establish a different set of lanes to enable solution of the lane ambiguities.

DONALD N. TIMBIE.

REFERENCES CITED

The following references are of record in the file of this patent:

UNITED STATES PATENTS

| Number | Name | Date |
|---|---|---|
| Re. 23,050 | Brunner | Nov. 23, 1948 |
| 2,148,267 | Honore | Feb. 21, 1939 |
| 2,440,755 | O'Brien | May 4, 1948 |
| 2,483,558 | O'Brien | Oct. 4, 1949 |
| 2,531,908 | Grenfell | Nov. 28, 1950 |

FOREIGN PATENTS

| Number | Country | Date |
|---|---|---|
| 582,085 | Great Britain | Nov. 5, 1946 |